(12) United States Patent
Young et al.

(10) Patent No.: US 8,305,279 B2
(45) Date of Patent: Nov. 6, 2012

(54) ANTENNA POSITIONER SYSTEM

(76) Inventors: Theodore Young, Ramona, CA (US);
Stephen W. White, Indiatlantic, FL (US); Kevin B. Davis, San Diego, CA (US); Joseph H. Fahle, Del Mar, CA (US); Jeffrey S. Hertig, San Diego, CA (US); Richard T. Van Pelt, Satellite Beach, FL (US); Earl K. Jones, Palm Bay, FL (US); John L. Schaumann, Melbourne, FL (US); Cary C. Bedford, Thousand Oaks, CA (US)

( * ) Notice: Subject to any disclaimer, the term of this patent is extended or adjusted under 35 U.S.C. 154(b) by 1186 days.

(21) Appl. No.: 11/929,812

(22) Filed: Oct. 30, 2007

(65) Prior Publication Data

US 2012/0182194 A1 Jul. 19, 2012

Related U.S. Application Data

(63) Continuation of application No. 11/261,268, filed on Oct. 28, 2005, now Pat. No. 7,298,342.

(60) Provisional application No. 60/622,676, filed on Oct. 28, 2004.

(51) Int. Cl.
*H01Q 3/00* (2006.01)
*H01Q 3/02* (2006.01)

(52) U.S. Cl. ....................................... 343/765; 343/882

(58) Field of Classification Search .................. 343/765, 343/757, 758, 763, 766, 882
See application file for complete search history.

(56) References Cited

U.S. PATENT DOCUMENTS

| 4,786,912 A | 11/1988 | Brown et al. |
| 5,419,521 A | 5/1995 | Matthews |
| 6,198,452 B1 | 3/2001 | Beheler et al. |
| 2003/0107525 A1 | 6/2003 | Ehrenberg et al. |

FOREIGN PATENT DOCUMENTS

DE 3739546 6/1989

*Primary Examiner* — Douglas W Owens
*Assistant Examiner* — Jennifer F Hu
(74) *Attorney, Agent, or Firm* — John K. Park; Park Law Firm

(57) ABSTRACT

A three-axis antenna positioner has an X-Y over azimuth configuration, and includes an azimuth drive assembly, an X-axis drive assembly, and a Y-axis drive assembly. Each drive assembly is independently operable. The azimuth drive assembly imparts 540° azimuthal rotational motion to an antenna about an azimuth axis. The X-axis drive assembly rotates the antenna about a horizontal X-axis at elevation angles between −90° and +90°. The Y-axis drive assembly rotates the antenna about a Y-axis at elevation complement angles between −2° and +105°. The azimuth axis, the X-axis, and the Y-axis all intersect at a common intersection point, and are mutually orthogonal. A controller operates each drive assembly so as to minimize antenna tracking velocity and acceleration. Each drive assembly may include dual drives, and may be operated in a bias drive mode to substantially eliminate backlash.

13 Claims, 9 Drawing Sheets

105

135

ANTENNA POSITIONER SYSTEM

CROSS-REFERENCE TO RELATED APPLICATIONS

This application is a continuation of: U.S. application Ser. No. 11/261,268, filed on Oct. 28, 2005, which is based upon and claims the benefit under U.S. Provisional Application Ser. No. 60/622,676, filed on Oct. 28, 2004. The entire contents of these applications are incorporated herein by reference.

BACKGROUND OF THE INVENTION

Satellite communications systems may be used to facilitate global exchange of information. In particular, significant growth is expected in the future for satellite communications in the higher transmission frequencies range (Ka-Band at 20-30 GHz), and at higher data rates. As one example, Low Earth Orbit (LEO) satellites typically require high transmission frequencies. These LEO satellites may be linked to each other and to ground based stations to provide wireless access over the surface of the Earth.

In order to communicate with the LEO satellites and other high frequency satellites by tracking them with an antenna, rigorous tracking requirements may have to be met. As a first step, the positioner for the antenna may have to be capable of precise, full-hemispherical tracking.

Conventional two-axis full-motion antenna positioners may have operational keyholes, or cones of silence, when tracking Low Earth orbiting (LEO) satellites. Although some three-axis designs may overcome many of the keyhole issues, they may still require relatively high velocity and acceleration capabilities. Some configurations may also be operationally constrained by the ground station latitude and satellite inclination angle.

There is a need for an antenna positioner system that can provide full hemispherical coverage without keyholes, for any satellite inclination angle and for any ground station latitude location, while minimizing the tracking velocity and acceleration requirements.

SUMMARY OF THE INVENTION

An antenna positioner system for positioning an antenna to track a moving object may include an azimuth drive assembly configured to impart azimuthal rotational motion to an antenna about an azimuth axis. The antenna positioner system may further include an X-axis drive assembly configured to impart rotational motion to the antenna about a horizontal X-axis that is orthogonal to the azimuth axis. The antenna positioner system may further include a Y-axis drive assembly configured to impart rotational motion to the antenna about a Y-axis orthogonal to both the X-axis and the azimuth axis. The antenna positioner may further include a controller configured to control operation of the azimuth drive assembly, the X-axis drive assembly, and the Y-axis drive assembly so as to optimize tracking velocity and acceleration. The azimuth axis, the X-axis, and the Y-axis may all intersect at an intersection point.

A method of tracking a moving object with an antenna assembly may include imparting rotational motion to the antenna assembly about an azimuthal axis. The method may further include imparting rotational motion to the antenna assembly about a substantially horizontal X-axis to vary an elevation angle of the antenna assembly. The method may further include imparting rotational motion to the antenna assembly about a Y-axis to vary an elevation complement angle of the antenna assembly. The azimuth axis, the X-axis, and the Y-axis may be mutually orthogonal. The azimuth axis, the X-axis, and the Y-axis may all intersect at an intersection point.

DETAILED DESCRIPTION OF THE INVENTION

A three-axis antenna positioner system is described that has an XY over azimuth configuration. The XY over azimuth configuration provides full horizon-to-horizon hemispherical coverage, with no operational keyholes, for any satellite inclination angle and for any ground station latitude location. The XY over azimuth design may allow for three independent modes of operation in a single unit, and may also minimize the tracking velocity and acceleration requirements along each axis. The antenna positioner system may use two drives per axis to generate a bias drive mode that provides for zero backlash and maximum pointing and tracking accuracies. A controller for the antenna positioner may automatically select between two optimized dual-axis tracking modes, to configure the positioner system for minimum tracking dynamics.

Figure 1A:
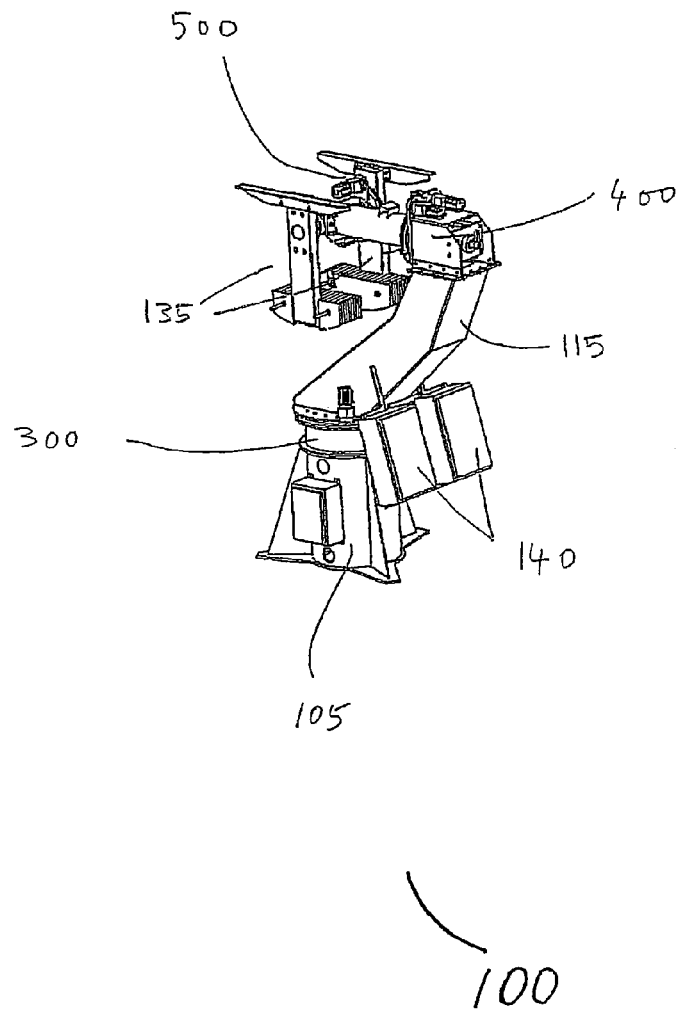
FIG. 1A illustrates one embodiment of a three-axis antenna positioner system having an X-Y over azimuth configuration.

FIG. 1A illustrates one embodiment of a three-axis antenna positioner system 100 having an X-Y over azimuth configuration with all three axes intersecting at a single point. In overview, the antenna positioner system 100 may include: a pedestal base 105; an azimuth drive assembly 300 mounted on the pedestal base; a riser weldment 115; an X-axis drive assembly 400 attached to the riser weldment 115; a Y-axis drive assembly 500 attached to the X-axis drive assembly 400; and reflector support arms 135 that attach the reflector of the antenna to the positioner system 100. A controller (e.g. an Antenna Control Unit or ACU 140) may control the operation of the azimuth drive assembly 300, the X-axis drive assembly 400, and the Y-axis drive assembly 500 so as to optimize the antenna tracking dynamics. Each of the three drive assemblies may be operated independently from each other.

Figure 1B:
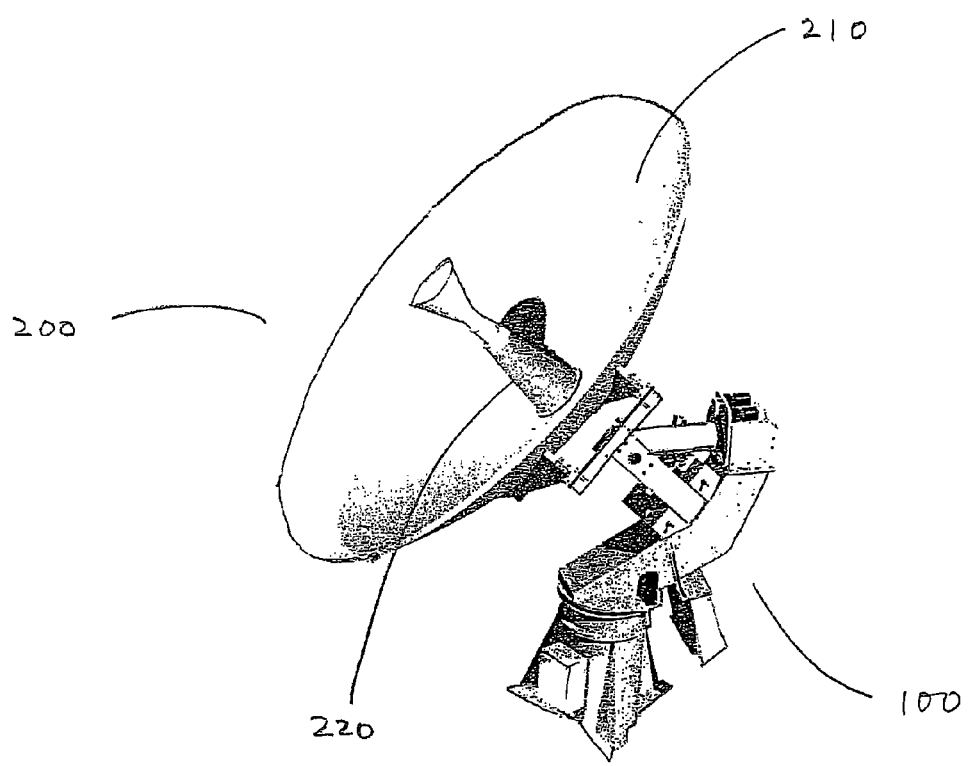
FIG. 1B shows an antenna that includes a reflector and a feed, and that is supported by the three-axis antenna positioner system shown in FIG. 1A.

FIG. 1B illustrates the antenna positioner system 100 that supports, positions, and moves an antenna assembly 200 to point at and/or track a moving object. The moving object may include, but is not limited to, satellites, other spacecraft (e.g. the Space Shuttle or the Space Station), launch vehicles, missiles, and aircraft. In the embodiment illustrated in FIG.

1B, the antenna assembly 200 includes a parabolic reflector 210 and a feed 220. It should of course be understood that the positioner system 100 may be used with antenna assemblies other than the illustrated parabolic antenna with reflector, including but not limited to sectoral antennas, flat panel antennas, and yagi antennas.

Referring back to FIG. 1A, the X-Y over azimuth configuration used in the antenna positioner 100 shown in FIG. 1 results in the same swept volume as a conventional two-axis EL/AZ (elevation-over-azimuth) configuration, while eliminating operational keyholes or cones of silence that typically occur when two-axis configurations such as EL/AZ and X-over-Y are used. Operational keyholes or cones of silence are angular coverage areas where unusually high values of axis angular dynamics are required in order to accurately point an antenna at a dynamic target such as a LEO satellite.

When a two-axis EL/AZ configuration is used for an antenna positioner, the antenna may track a satellite by rotating the reflector about two rotational axes, namely an azimuth axis for tracking its azimuth angle, and an elevation axis for tracking the satellite's elevation with respect to the horizon. With this configuration, the reflector may move up to 360 degrees in azimuth, and 0-90 degrees in elevation. In a two-axis X-Y tracking configuration, the independently operable X- and the Y-axis drives may be mounted on top of each other, and at 90 degrees with respect to each other.

Two-axis designs such as EL/AZ and XY may exhibit operational keyholes, depending on the inclination angle of the satellite orbit, resulting in the loss of critical data. Use of the EL/AZ design may result in a vertical cone of silence at or near the zenith of an overhead pass, i.e. at very high elevation angles. Very high slew rates may have to be used in order to minimize the operational keyholes. Use of the XY design may substantially overcome the zenith pass keyhole problem, but operational keyholes may occur at elevation angles near the horizon. This is because the XY tracking configuration may require high tracking dynamics at low elevation angles.

In the illustrated embodiment of the antenna positioner system 100, the azimuth drive assembly 300 may be mounted on the pedestal base 105, and may impart azimuthal rotational motion to the antenna assembly about an azimuth axis. The X-axis drive assembly 400 may impart rotational motion to the antenna about a horizontal X-axis orthogonal to the azimuth axis. The rotation about the X-axis varies the elevation angle of the antenna, as measured with respect to the horizon. The Y-axis drive assembly 500 may impart cross-axis rotational motion to the antenna assembly about a Y-axis. The rotation about the Y-axis varies the elevation complement angle of the antenna. The Y-axis is orthogonal to both the X-axis and the azimuth axis. The X-axis, the Y-axis, and the azimuth axis all intersect at a common intersection point.

Because the X- and Y-axis drive assemblies are mounted on the azimuth drive assembly 300 in such a way that all three axes intersect at a common point, as is typical of an EL/AZ positioner, a minimal swept volume for the antenna may result. The XY over azimuth configuration shown in FIG. 1A and described above combines the optimal capabilities of each of the two-axis configurations, into an integrated 3-axis design within a single unit.

Each drive assembly along each axis may be a dual drive assembly that uses two drive trains. The drive trains may include embedded servo control. Each drive train may include an integrated DC servomotor, an internal servo controller, and a servo precision gearbox. The dual drive trains, combined with servo bias drive techniques, may provide high reliability, zero backlash, and superior servo stiffness.

Figure 2A:
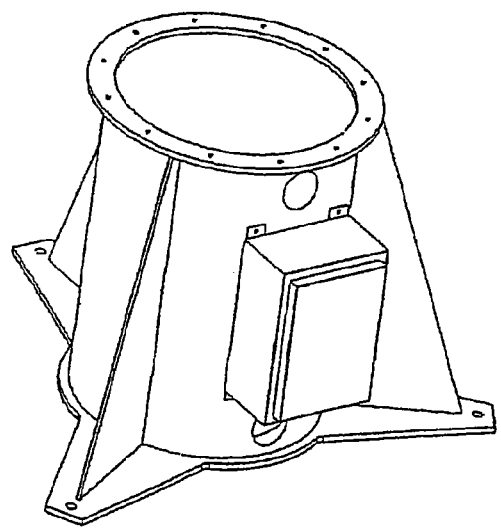
FIG. 2A illustrates a pedestal base in the antenna positioner system shown in FIG. 1A.

FIG. 2A illustrates an antenna pedestal base 105, used in one embodiment of the antenna positioner 100. The pedestal base may be a cylindrically shaped steel weldment, although other embodiments of the antenna positioner 100 may use different materials and different shapes for the pedestal base 105. In the illustrated embodiment, the pedestal base 105 is shown as being mounted to the antenna foundation at three points to provide support for the positioner, although different mounting configurations may be used in other embodiments of the antenna positioner system 100. The three-point mount may also allow for the setting and maintaining of azimuth axis verticality.

Figure 2B:
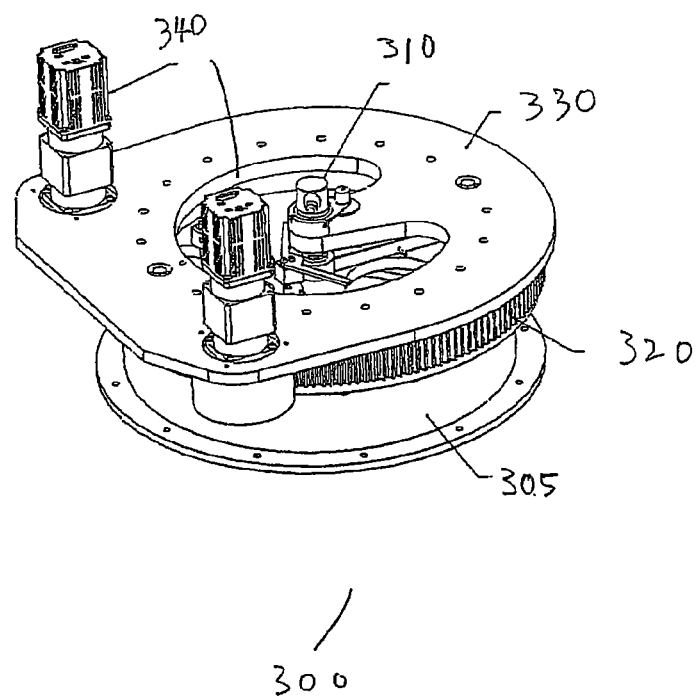
FIG. 2B illustrates one embodiment of an azimuth drive assembly.

FIG. 2B illustrates one embodiment of an azimuth drive assembly 300, which may be mounted on top of the pedestal base 105 shown in FIG. 2A. In one exemplary embodiment, the azimuth drive assembly 300 may include an azimuth drive shaft 305, an azimuth motion encoder 310, an azimuth bull gear 320, a drive plate 330, and two independent drive trains 340. The azimuth drive shaft 305 may be a cylindrical weldment, although different shapes and materials may be used in other embodiments of the azimuth drive assembly 300. The azimuth drive assembly may be configured to impart ±270° azimuthal rotational motion to the antenna assembly 200. A cable wrap chain may be provided, to allow for the ±270° azimuth travel.

Each one of the two independent drive trains 340 may include a DC servomotor, coupled to a precision planetary gearbox, and limit switches. The motion encoder 310 in the azimuth drive assembly 300 may be configured to detect azimuth position, and to provide over-travel protection as well as positioning feedback to the controller 140. In one embodiment, the motion encoder 310 may be mounted directly to the azimuth drive shaft axis, thereby substantially eliminating windup, transmission errors and backlash. As explained in more detail below, the pair of drive trains 340 may provide an intelligent bias-drive capability, resulting in zero backlash, superior stiffness, and high accuracy positioning.

Figure 2C:
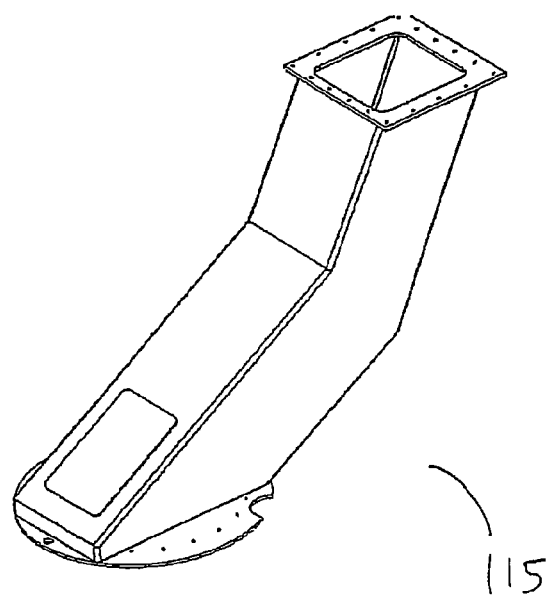
FIG. 2C illustrates one embodiment of a riser weldment that couples the azimuth drive assembly to the X- and Y-axis drive assemblies.

FIG. 2C illustrates one embodiment of a riser weldment 115, which may be used to attach the azimuth drive assembly 300 to the X-Y drives. In the embodiment illustrated in FIG. 2C, the riser weldment 115 may be rectangular in cross-section, and may be shaped to provide clearance for the counterweight support arms 135, while maximizing stiffness with minimal weight.

Figure 3A:
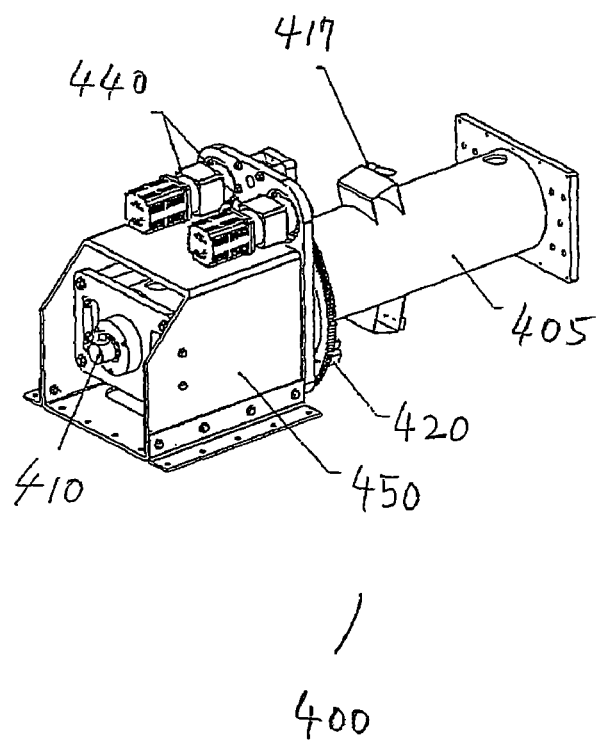
FIG. 3A illustrates one embodiment of an X-axis drive assembly.

FIG. 3A illustrates one embodiment of an X-axis drive assembly 400. In overview, the X-axis drive assembly 400 may include: an X-axis drive shaft 405; an X-axis motion encoder 410; limit switches 417; X-axis bull gear 420; two X-axis drive trains 440; and an X-axis drive housing 450. The X-axis drive assembly 400 may be configured to impart to the antenna. ±90° horizontal rotation about the X-axis, thereby varying the elevation angle of the antenna. This may be accomplished using the dual drive trains 440 coupled to the bull gear 420. Each drive train 440 may include a servo motor/gearbox assembly.

The X-axis drive shaft 405 may be a cylindrical steel weldment, and may be supported by precision ball bearings at two points of contact, in one exemplary embodiment. The X-axis motion encoder 410 may be configured to detect X-axis position, and to provide position feedback to the ACU 140. The encoder 410 may be mounted directly to the X-axis drive shaft 405 at the rear of the drive assembly 400, to eliminate windup, backlash and transmission errors. In one embodiment, the X-axis motion encoder 410 may be a 16-bit encoder, although other types of encoders may be used in different embodiments of the drive assembly 400. The limit switches 417 may be located above the bull gear 420. The limit switches 417 combined with bull gear mounted elastomer stops may provide over-travel protection.

Figure 3B:
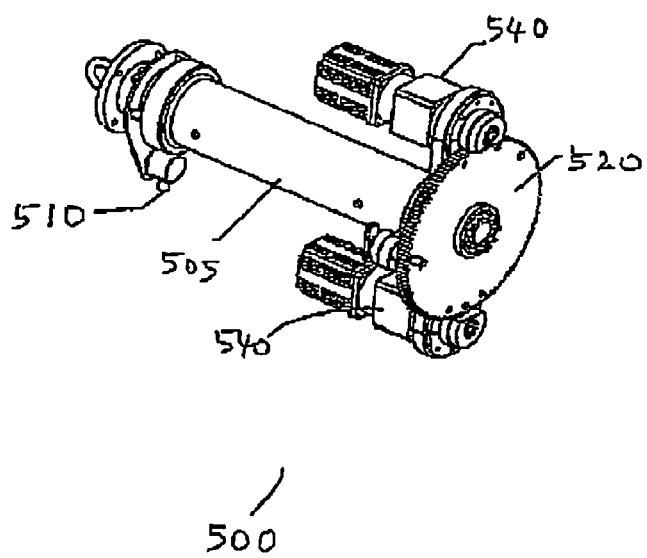
FIG. 3B illustrates one embodiment of a Y-axis drive assembly.

FIG. 3B illustrates one embodiment of a Y-axis drive assembly 500. In overview, the Y-axis drive assembly 500 may include: a Y-axis shaft and housing 505; a Y-axis motion encoder 510; Y-axis bull gear 520; and two Y-axis drive trains 540. The Y-axis drive assembly 500 may be configured to impart −2° to +105° cross-axis rotary motion to the antenna assembly, thereby varying the elevation complement angle of the antenna assembly. By analogy to the X-axis drive assembly 400, this may be accomplished using the dual drive trains 540 (i.e. motor/gearbox assemblies) coupled to the bull gear 520. The encoder 510 may be located at one end of the Y-axis shaft 505, and may be used to detect Y-axis motion.

The positioner system 100 may operate in a pure EL/AZ mode, or as a pure X-Y mode, depending on the satellite track. This is because the above-described X-Y over azimuth configuration, which has a common intersection point for all three axes, provides for both X-Y and EL/AZ tracking capabilities. This dual operating mode capability eliminates the need for full motion (180 degrees) Y-axis travel. The ACU 140 may thus be configured to limit the rotational motion around the Y-axis to between about −2° and about +105° in elevation complement angle. The limitation of Y-axis rotation motion may lower the volume swept by the rotating antenna, and may simplify the mounting of the antenna reflector. Also, it may also make it easier to counterweight the reflector, and may lower the cost of the positioner system 100.

Figure 3C:
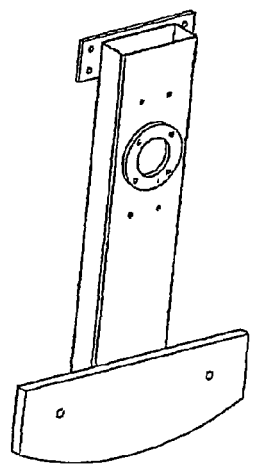
FIG. 3C illustrates a reflector support arm for the antenna illustrated in FIG. 1A.

All rotating mass may be balanced at the axes intersection point. Reflector support arms 135 may be provided, to counter balance the antenna reflector. FIG. 3C illustrates a reflector support arm 135 for the antenna assembly 200 illustrated in FIG. 1B. In one embodiment of the antenna positioner system 100, a pair of identical reflector support arms 135 may be mounted to the ends of the Y-axis shaft 505. The support arms 135 may attach the reflector 210 of the antenna assembly 200 to the positioner system 100. The support arms 135 may also be configured to provide counter-balancing for the reflector 210. In the illustrated embodiment, the reflector support arm 135 is a steel weldment constructed from standard structural shapes. In an exemplary embodiment, the left support arm may be bolted to the Y-axis bull gear, while the right support arm may be attached to the Y-axis shaft.

The controller for the X-Y over azimuth positioner, e.g. the ACU 140 shown in FIG. 1A as being located at the base of the azimuth axis, may provide real-time control of the drive assemblies along all three axes. The ACU 140 may automatically configure the positioner system 100 for minimum tracking dynamics, and eliminate all keyholes for full hemispherical coverage. In particular, the ACU 140 may automatically select between two optimized dual-axis tracking modes so that the tracking velocities are always near their theoretical minimum, as described in further detail below.

The ACU 140 may implement a servo control loop, together with the internal servo controllers embedded within the drive trains. The drive trains along each axis may be configured to close an internal velocity or positioning control loop, using feedback from the motor encoders at the respective axes. The ACU 140 may be configured to close the positioner velocity and positioning control loops by integrating feedback from the motion encoders. The ACU 140 may use a TCP/IP (Transmission Control Protocol/Internet Protocol) interface for status, control, and monitoring.

The ACU 140 may be configured to automatically select between two optimized dual-axis tracking modes, and to configure the positioner system 100 for minimum tracking dynamics. In other words, the ACU 140 may operate the positioner system 100 in a pure EL/AZ mode, or as a pure X-Y mode, depending on the satellite track. This is because the X-Y over azimuth configuration described above, with a common intersection point for all three axes, provides for both X-Y and EL/AZ tracking capabilities, which enables the positioner system 100 to minimize the required tracking velocities and accelerations for any given pass. This may increase tracking performance and accuracy, while minimizing power consumption and wear and tear on mechanical components, thus extending the system lifetime.

In one embodiment, the ACU 140 may be configured to implement mode optimization by calculating the azimuth and elevation at the highest elevation angle for any given pass, and using this information to select the optimum mode for tracking. If the ACU 140 determines that the highest expected elevation angle during the pass is greater than or equal to 45 degrees, the ACU 140 may select the X-Y mode and may lock the active azimuth axis to an angle which minimizes the tracking velocities and accelerations through out the pass. The ACU 140 may then support the pass by effecting rotational motions along the X-axis and the Y-axis.

If the ACU 140 determines that the highest expected elevation angle during the pass will be less than 45 degrees, the ACU 140 may select the Y over Azimuth mode, similar to a pure Elevation-over-Azimuth system. Again, the ACU 140 may optimize this mode to minimize required tracking velocities and accelerations for the pass. The ACU 140 may statically set and locks the X-axis to zero elevation angle (i.e. "zenith"), then supports the pass by effecting rotational motions along the active azimuth axis and the Y-axis.

Figure 4:
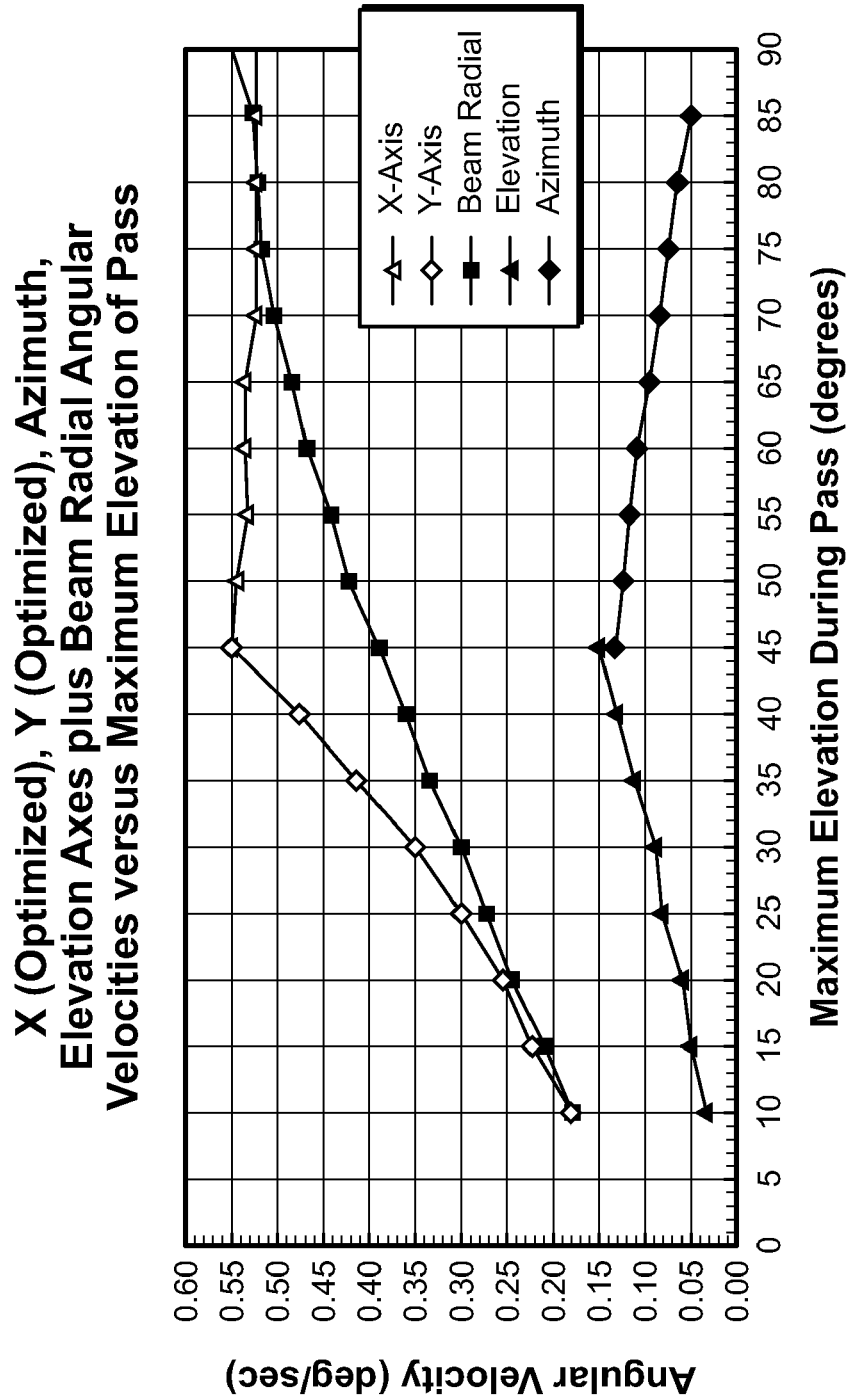
FIG. 4 illustrates a graph of the angular velocities about an optimized x-axis, an optimized y-axis, an azimuth axis, and an elevation axis, as a function of the maximum elevation angle during a pass.

This capability of operating in either mode may eliminate keyhole effects at both the horizon and the zenith positions. This is illustrated in FIG. 4, which illustrates a graph of the angular velocities about the optimized x-axis, the optimized y-axis, the azimuth axis, and the elevation axis, as a function of the maximum elevation angle during a pass. As shown by the graph in FIG. 4, operational keyholes are eliminated for all elevation angles ranging from 0 degrees to 90 degrees, i.e. from zenith to horizon. For all elevation angles, the angular velocities about all axes are under about 0.7 radians per sec.

The above-described dual mode operation may significantly reduce tracking velocities and acceleration, and may result in an optimal tracking performance. By minimizing tracking dynamics, power requirements and stress on all drive components may be greatly reduced, resulting in longer life and lower lifecycle costs.

In sum, an antenna positioner system with an X-Y over active azimuth configuration has been described. The antenna positioner system provides full hemispherical coverage at all elevations above the horizon, unconstrained by satellite inclination angle and ground station latitude, eliminating all operational keyholes. The operation of the positioner system may be controlled by a controller so as to substantially eliminate backlash, minimize tracking dynamics, and maximize pointing accuracy.

While certain embodiments have been described of an antenna positioner system, it is to be understood that the concepts implicit in these embodiments may be used in other embodiments as well. The protection of this application is limited solely to the claims that now follow.

In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. An antenna positioner system for positioning an antenna to track a moving object, the antenna positioner system comprising:
   an azimuth drive assembly configured to impart azimuthal rotational motion to the antenna about an azimuth axis;
   an X-axis drive assembly configured to impart rotational motion to the antenna about a horizontal X-axis orthogonal to the azimuth axis, wherein the X-axis drive assembly comprises: an X-axis drive shaft; an X-axis motion encoder; limit switches; X-axis bull gear; two X-axis drive trains; and an X-axis drive housing, wherein the two X-axis drive trains are coupled to the X-axis bull gear;
   an Y-axis drive assembly configured to impart rotational motion to the antenna about a Y-axis orthogonal to both the X-axis and the azimuth axis, wherein the Y-axis drive assembly comprises: a Y-axis shaft and housing; a Y-axis motion encoder; Y-axis bull gear; and two Y-axis drive trains, wherein the two drive trains are coupled to the Y-axis bull gear; and
   a controller configured to control operation of the azimuth drive assembly, the X-axis drive assembly, and the Y-axis drive assembly so as to optimize tracking velocity and acceleration;
   wherein the rotational motion imparted to the antenna by the X-axis drive assembly about the X-axis encompasses an elevation angular range between about −90 degrees to about +90 degrees and wherein the azimuth axis, the X-axis, and the Y-axis all intersect at an intersection point.

2. The antenna positioner system of claim 1, wherein the controller is configured to limit the rotational motion of the antenna about the Y-axis to rotational angles between about −2 degrees to about +105 degrees.

3. The antenna positioner system of claim 2, wherein the rotational motion to the antenna by the azimuth drive assembly about the azimuth axis encompasses an azimuthal angular range between about −270 degrees to about +270 degrees.

4. The antenna positioner system of claim 1, wherein the X-axis drive assembly is coupled to the azimuth drive assembly, and the Y-axis drive assembly is coupled to the X-axis drive assembly; and wherein each of the azimuth drive assembly, the X-axis drive assembly, and the Y-axis drive assembly is independently operable.

5. The antenna positioner system of claim 1, further comprising a structural element configured to couple the azimuth drive assembly to the X-axis and the Y-axis drive assemblies.

6. The antenna positioner system of claim 1, wherein the moving object comprises at least one of an LEO (Low Earth Orbiting) satellite, a satellite, a launch vehicle, a missile, an aircraft, and a spacecraft.

7. The antenna positioner system of claim 1, wherein the antenna assembly comprises a reflector and an antenna feed; and further comprising one or more support elements configured to counter-balance the reflector.

8. The antenna positioner system of claim 7, wherein the support elements are further configured to attach the reflector to the positioner system, and comprise steel weldments.

9. The antenna positioner system of claim 1, further comprising a pedestal base; wherein the X-axis drive assembly and the Y-axis drive assembly are coupled to the azimuth drive assembly.

10. A method of tracking a moving object with an antenna assembly, the method comprising:
   imparting azimuth rotational motion to the antenna assembly about an azimuth axis;
   imparting rotational motion to the antenna assembly about a substantially horizontal X-axis to vary an elevation angle of the antenna assembly; and imparting rotational motion to the antenna assembly about a Y-axis to vary an elevation complement angle of the antenna assembly;
   wherein the azimuthal axis, the X-axis, and the Y-axis are mutually orthogonal;
   wherein the azimuthal axis, the X-axis, and the Y-axis all intersect at an intersection point and the rotational motion about the X-axis encompasses elevation angles between about −90 degrees to about +90 degrees, and
   wherein the acts of imparting rotational motions along the azimuth axis, the X-axis, and the Y-axis comprise the acts of operating an azimuth drive assembly, and an x-axis drive assembly, and a Y-axis drive assembly that are coupled to each other and included within an integrated antenna positioner system;
   wherein the X-axis drive assembly comprises: an X-axis drive shaft; an X-axis motion encoder; limit switches; X-axis bull gear; two X-axis drive trains; and an X-axis drive housing, wherein the two X-axis drive trains are coupled to the X-axis bull gear;
   wherein the Y-axis drive assembly comprises: a Y-axis shaft and housing; a Y-axis motion encoder; Y-axis bull gear; and two Y-axis drive trains, wherein the two drive trains are coupled to the Y-axis bull gear.

11. The method of claim 10, wherein the rotational motion about the azimuth axis encompasses azimuthal angles between about −270 degrees to about +270 degrees; and further comprising the act of limiting the rotational motion around the Y-axis to rotational angles between about −2 degrees and about +105 degrees.

12. The method of claim 10, wherein the acts of imparting rotational motions along the azimuth axis, the X-axis, and the Y-axis further comprise operating each of the azimuth drive assembly, the X-axis drive assembly, and the Y-axis drive assembly independently from one another.

13. The method of claim 10, further comprising the act of operating at least one of the azimuth drive assembly, the X-axis drive assembly, and the Y-axis drive assembly in a bias drive mode to substantially eliminate backlash.

* * * * *